United States Patent [19]

Smith et al.

[11] Patent Number: 4,896,427

[45] Date of Patent: Jan. 30, 1990

[54] DRAUGHTING APPARATUS

[76] Inventors: Joseph W. K. Smith, Glenview, 12 Lady Brae, Gorebridge, Midlothian, EH23 4HT, Scotland; Kevin F. Bannister, 12 Lilac Grove, Pitcorthie, Dunfermline, Scotland, both of Scotland

[21] Appl. No.: 316,543

[22] Filed: Feb. 23, 1989

Related U.S. Application Data

[63] Continuation of Ser. No. 90,161, Aug. 27, 1987, abandoned.

[30] Foreign Application Priority Data

Aug. 28, 1986 [GB] United Kingdom ................. 8620769

[51] Int. Cl.[4] ................................................ G01B 5/00

[52] U.S. Cl. .................................. 33/1 G; 33/1 AA; 33/430; 33/614; 33/617

[58] Field of Search ............. 33/430, 1 G, 1 AA, 614, 33/616, 617, 622; 101/382 MV, 399, 400, 269; 434/72, 73, 80, 87, 88

[56] References Cited

U.S. PATENT DOCUMENTS

| | | | |
|---|---|---|---|
| 1,964,236 | 6/1934 | Welch | 101/269 X |
| 2,034,584 | 3/1936 | Lamb | 101/269 |
| 2,100,114 | 11/1937 | Walsh | 33/614 X |
| 2,958,948 | 11/1960 | Dunkelberger | 101/382 MV |
| 2,994,265 | 8/1961 | Hurlbut et al. | 101/269 |
| 3,223,454 | 6/1967 | McFarland | 101/269 |
| 3,280,738 | 10/1966 | Goodrich | 101/269 |
| 3,862,598 | 1/1975 | Hawthorne . | |
| 3,890,899 | 6/1975 | Brugge et al. . | |

FOREIGN PATENT DOCUMENTS

| | | | |
|---|---|---|---|
| 133543 | 10/1919 | United Kingdom | 434/85 |

*Primary Examiner*—Harry N. Haroian

*Attorney, Agent, or Firm*—Stephen G. Rudisill

[57] ABSTRACT

A draughting apparatus 10 comprising a plurality of substantially planar symbols elements 30 having raised outlines 50 for depicting predetermined symbols 32, a support panel means 12, 16, for supporting the symbols elements 30 in a generally planar layout, said symbols elements 30 being provided with symbol element locating means 34, 16, and symbol transfer means comprising a self-duplicating set of sheets 36 of draughting material having at least two sheets 36, and a pressure transfer means 24, said at least two sheets 36, being disposable between said raised outlines 50 of said symbols elements 30 and said pressure transfer means 24 so that pressure applied by said pressure transfer means 24 causes the outline of said symbols 32 to be transferred to at least one of said two sheets 36 to create an image of said symbols outlines thereon.

12 Claims, 2 Drawing Sheets

DRAUGHTING APPARATUS

This is a continuation of co-pending application Ser. No. 07/090,161 filed on 8/27/87.

The present invention relates to draughting apparatus and in particular to apparatus for transferring symbols to a sheet(s) of paper or other draughting material for retaining a hard copy of an image. The apparatus is particularly, but not exclusively, suitable for transferring images of kitchen designs, bathroom designs, storage and supermarket shelving layouts, laundry equipment layouts, hospital ward layouts, office furnishing schemes, production bakery or factory layouts, cloakroom lockers and fittings layouts, military field issue maps showing symbol dispositions for immediate field issue, etc., interior furnishings and the like involving many different symbol configurations and layouts.

Planning and designing interiors of building and rooms such as kitchens, bathrooms and the like requires considerable time and expertise. At present the layout of a room has to be drawn on paper and the outlines or stencils of the kitchen units and appliances are drawn within the outline. This is time consuming and if changes to the layout are required then the whole process has to be repeated or not easily amended. Alternative Hitech systems such as computer aided draughting are expensive, require a skilled operator, have initial lengthy set up periods and are often static.

Furthermore, such layouts are more often drawn on large drawing boards which are non-portable so that customers require to travel to a shop or other premises in order to obtain a design, or if too remote, wait lengthy periods for drawings. It is often desirable for the customer to have the design drawn in their own premises to permit detailed appreciation of the environment and the layout required.

Furthermore, with existing systems copies are not readily made or available. A photocopy is usually required and this often has to have the facility to reduce the size of the drawing sheet to a manageable size such as foolscap or A4. This process is also time consuming and generally requires photocopying facilities which are impractical in an onsite environment.

An ideal interior design system should satisfy a number of criteria in addition to being inexpensive and easy to use. It should permit hard copies to be rapidly and easily made and should also permit more flexible designs to be made in a rapid and easy manner. Various copies should be made simultaneously without the requirement of a photocopier and then apparatus for fulfilling this function should be portable and easy to set up either in a studio or in an on-site environment.

Furthermore, the system should have applicability to other areas such as games or any other environment where it is desired to transfer representatives of symbols to create a permanent image.

The present invention provides a draughting apparatus comprising a plurality of substantially planar symbols elements having raised outlines for depicting predetermined symbols, a support panel means for supporting the symbols elements in a generally planar layout, said symbols elements being provided with symbol element locating means, and symbol transfer means comprising a self-duplicating set of sheets of draughting material having at least two sheets and a pressure transfer means, said at least two sheets being disposable between said raised outlines of said symbols elements and said pressure transfer means so that pressure applied by said pressure transfer means causes the outline of said symbols to be transferred to at least one of said two sheets to create an image of said symbols outlines thereon.

Preferably there is used a symbols support means in the form of a sheet of magnetic or magnetisable material and at least part of said symbols elements are, of a magnetisable or magnetic, respectively, material so that they are attracted to the sheet said at least part of said symbols elements and said sheet together comprising said symbol element locating means.

In an alternative form of the invention there is used a symbols locating means in the form of an adhesive sheet material attached to the back of the symbols elements so that they can be attached to and detached from said first sheet of said set.

In yet another form of the invention there is used a symbols support means comprising a first component and the underside of each symbols element a second component, of a hook and loop type fastener system constituting said symbols locating means.

The symbols elements may have any suitable type of symbol formed in raised outline thereon depending upon the particular application for which the apparatus is to be used. Thus for example, in the case of kitchen planning and interior design applications there would be used symbols representing kitchen items such as cupboards, appliances and the like, and/or symbols such as bathroom appliances or furniture.

Conveniently the apparatus uses a support sheet or panel means in the form of a drawing board provided with a sliding cursor, one side of the sliding cursor having a parallel edge and the other side of the cursor mounting a roller constituting the pressure transfer means, the cursor being rotatable through 180° so that the roller can be positioned to face the drawing board surface.

Alternatively or in addition, there could be used a simple hand-held roller as a pressure transfer means though some care may need to be taken in detecting the position of the symbols elements under the draughting material and in avoiding accidental displacement of the symbols elements as a result of too much pressure being applied to the edge causing a "pushing" effect.

According to another aspect of the invention there is provided a method of creating a fixed image made up of a plurality of symbols, which method comprises the steps of providing an apparatus of the invention, positioning the symbols elements directly or indirectly on the support panel or sheet means, disposing said self-duplicating set of sheets of draughting material over said symbols elements, and applying pressure to said sheets of draughting material disposed on said symbols elements sufficient to transfer images of said symbols to at least one of said sheets of draughting material.

Thus by means of the present invention it is possible quickly and readily to provide a series of modified images simply by changing symbols and/or repositioning symbols elements as required and repeating the transfer process with fresh sets of draughting materials to create new images in a rapid and efficient manner.

Various types of draughting materials including paper and suitable films may be employed. Also various self-duplicating systems may be used including systems employing carbon paper or the like and most preferably systems using so-called NCR (no carbon required) or carbon-less paper. Advantageously there is used a set provided with a top sheet of grid pattern or graph paper in order to facilitate quick and accurate drawing of symbol element locating guidelines etc. without the need for parallel motion rules or cursors or the like.

These and other aspects of the invention will become apparent from the following description when taken in combination with the accompanying drawings in which:

FIG. 1 is a perspective view of a draughting apparatus in accordance with a first embodiment of the invention;

FIGS. 2(*a*),(*b*),(*c*),(*d*),(*e*) and (*f*) depict the steps in the symbol transfer procedure;

FIG. 7 is a schematic vertical section partly enlarged illustrating the transfer process in a modified embodiment.

Figure 1:
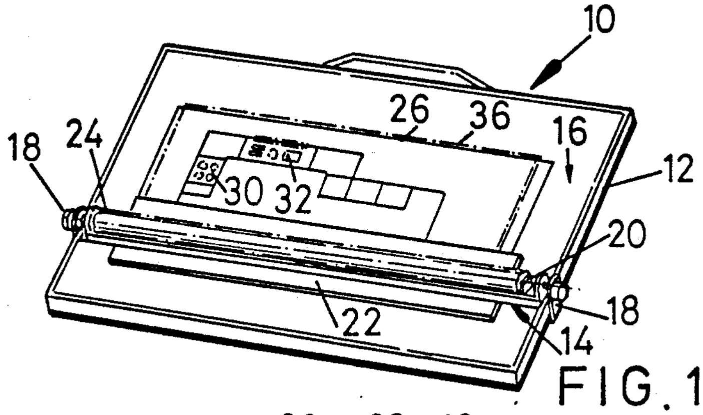
Figure 2A:
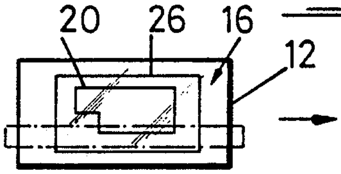
Figure 2B:
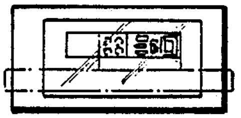
Figure 2C:
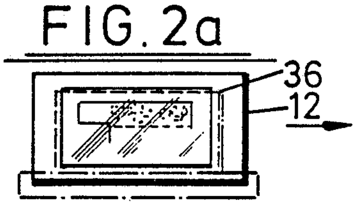
Figure 2D:
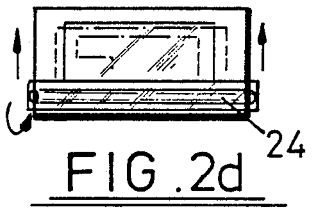
Figure 2E:
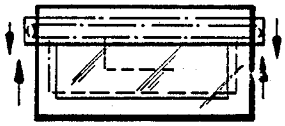
Figure 2F:
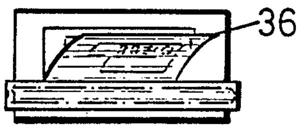

Reference is now made to FIG. 1 of the drawings which depicts symbol transfer apparatus generally indicated by reference numeral 10 including a drawing board 12 having a slidable cursor 14. The drawing board 12 has a drawing surface 16 across which the cursor 14 slides on spaced mounts 18. The cursor consists of central support member 20 on which one side is secured a straight edge 22 and the other side of which is secured to resilient pressure roller 24.

The arrangement of the cursor is such that the roller 24 and the straight edge 22 can be rotated relative to the drawing surface 16 so the pressure roller 24 faces the surface 16 for applying pressure to transfer an image of symbols onto paper as will be later described. This rotation is accomplished by rotatably mounting the support member 20 on the spaced mounts 18.

Figure 4:
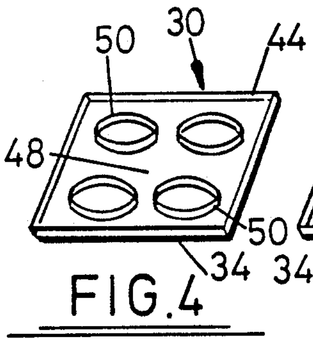
FIGS. 4 and 5 are perspective views of cooker hob and sink unit symbols elements used in the apparatus of FIG. 1.
Figure 5:
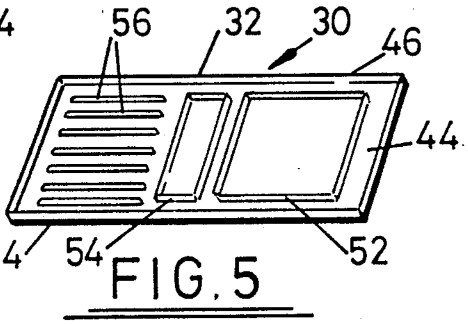
Figure 6:
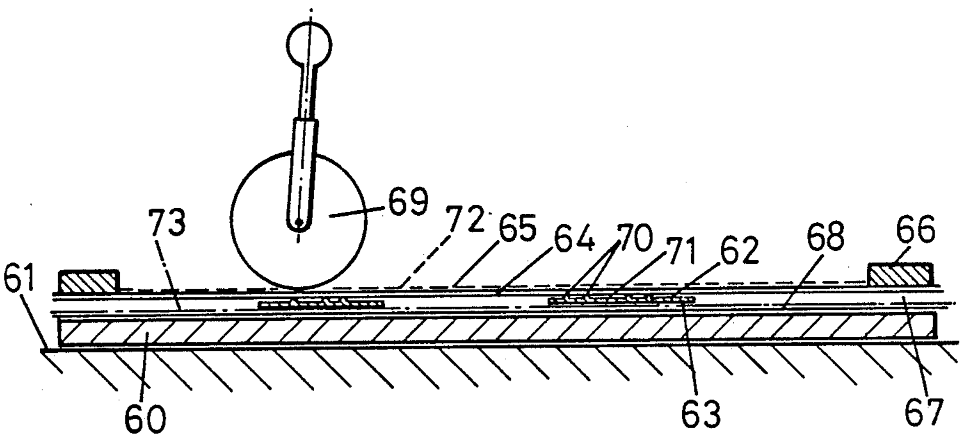

The surface 16 is made of a resilient magnetic polymer for attraction to magnetic symbols 30,32 (FIGS. 4 and 5). Shown on the surface of the drawing board is a sheet of self-duplicating paper 26 which has an outline 28 of a kitchen drawn thereon. Disposed within the outline of the kitchen are a plastic symbol 30,32 typical of kitchen units. As best seen in FIGS. 4 and 5 the plastic symbols have a raised portion so that the symbol outline can generally be perceived. The rear surface 34 of the symbols is magnetic or metal for attraction to the backing sheet. It will be seen that by simply positioning the symbols within the outline of the kitchen they remain fixed in position because of magnetic attraction so that a plan of the kitchen can be obtained on the drawing board.

As shown in broken outline, two self-duplicating sheets 36 which have previously had the wall outline transmitted through them and then having subsequently been laid aside until the symbols are laid out on one copy of the paper, are now disposed over the symbols on top of the paper outline and magnetic strips are placed vertically up each edge to hold the paper firm, the cursor is reversed so that the pressure roller 24 faces the surface 16. The user then leans on the roller and pushes it over the paper and the symbols so that an image of the symbol outlines is transferred to the self-duplicating paper. Once this has been achieved the hard copy can be removed and handed to the customer. The symbols can be removed and if required, all sheets can be re-applied for the addition of item numbers, a legend or perhaps custom hand drawn detail. As will be explained, this procedure can be repeated as many times by simply changing the position of the symbols within the outline and repeating the procedure.

The procedure is best illustrated in FIGS. 2(*a*) through 2(*f*). Firstly, as seen in FIG. 2(*a*) a panel 26 containing multi-sheet of self-duplicating paper is placed on top of the surface 16 of the drawing board 12, these are held in position by magnetic strip(s) and the outline 28 of the kitchen is drawn on the top sheet with the aid of the straight edge 22. The copies are laid aside for future duplicating, next magnetic symbols of kitchen equipment, such as a hob and sink are disposed within the outline of the kitchen as seen in FIG. 2(*b*) and accurately positioned using straight edge 22. The remainder duplicating sheets 36 are positioned over the outline 18 of the kitchen and the magnetic symbols as seen in FIG. 2(*c*) and the cursor 14 is then reversed so that the roller 24 is in contact with the magnetic fixing strips which act as a spacer. The cursor is then firmly pressed and moved across the symbols and the duplicating paper 36 as shown in FIG. 2(*e*). This can be done several times to ensure that the outline of the symbols 30 are transferred to the duplicating paper 36. A small hand held roller may be used to pick up any small piece of detail the big roller has missed.

As seen in FIG. 2(*f*), once this has been completed an image of the outline of the kitchen with the placement of the units is obtained from the duplicating sheets 36. Hard copies are provided and one of these can be passed to a customer and the others retained for records and comparison, or issued to other traders or parties.

It will be appreciated that any number of different plans can be readily obtained by simply repositioning the symbols within the kitchen outline and repeating the procedure.

Figure 3:
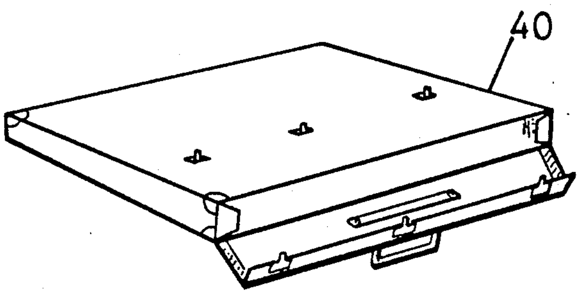
FIG. 3 is a perspective view of a carrying case for the apparatus of FIG. 1.

The drawing board 12 and the symbols can be conveniently carried in a carrying case 40 as best seen in FIG. 3. A separate small business type case carries the symbols which are held in coded trays. It will be appreciated that this gives the system and apparatus portability so that design can be achieved within a customer's establishment.

FIGS. 4 and 5 depict enlarged perspective views of typical symbols 30 and 32 as shown in FIG. 1. The symbols are made of plastic and have a magnetic base 34 which can be of magnetic polymer or a metal. The symbol 30 depicts a hob unit 32 and a sink unit. The edges of the hob and sink units 44 and 46 respectively are upstanding from the surface 48 of the symbols. Similarly, with regard to the hob unit, the rings 50 are also upstanding from the surface 48 and similarly with the outline in the sink unit 52,54 and the draining tray 56.

Thus, when the roller 24 rolls across the board 12 the pressure effected by the roller to the sheet 36 results in the pressure being generated by the edges of the symbols sufficient to cause pressure outline on the duplicating sheets 36 with the result that the image created by the symbols is transferred to the sheets 36.

It will be appreciated that various modifications may be made to the structure hereinbefore described without departing from the scope of the invention. For example, materials need not be magnetic but any suitable type of detachable fastening may be used such as Velcro adhesive and the like. Furthermore, any number of duplicating sheets can be used consistent with obtaining a pressure imprint on using the roller. Also the symbols need not be plastic and can be of any shape or size as convenient. The roller can be hand held.

The invention has application in many fields in addition to kitchen planning and furniture layout. It could be used for copying, colour craftwork for a housing estate layout, boat or caravan layout or a children's toy or any subject involving arrangement of symbols on a plan with the requirement to keep a copy of the resulted plan.

Advantages of the invention are that it is portable, quick, encourages customer participation forming a relationship, relatively inexpensive and the system is provided so that planning can be effective and a hard copy obtained. The system permits rapid and flexible design of different layouts in an efficient and straightforward manner without skilled operators.

FIG. 7 shows a further embodiment generally similar to that of FIG. 1 having a flexible magnetic polymeric support sheet 60 which can conveniently be rolled up when not in use for ease of transportation and in use can be laid out on a rigid back support such as a table top 61. Rubber symbols elements 62 with backing sheets 63 of ferromagnetic metal are placed on the support sheet 60 and retained in position thereon by magnetic attraction between the symbols element backing sheets 63 and the support sheet 60 which together constitute symbols element locating means. On top of the duly positioned symbols elements 62 are placed in turn a sheet of plain paper 64 and a sheet of carbon paper 65 which together constitute a self-duplicating set of sheets of draughting material which is retained in position on the support sheet 60 by ferrometallic or magnetic polymeric strips 66 along either edge 67.

In order to facilitate arrangement of the symbols elements 62 relative to a given framework such as the walls of a room in a plan thereof, a further sheet 68 on which the framework has been previously drawn, is placed immediately on top of the support sheet 60 and the symbols elements 62 positioned thereon.

The transfer process is effected by passing the handheld roller 69 more or less heavily across the assembly of sheets 65,64,68 symbols elements 62 and support sheet 60 so that printing ink is transferred from the carbon paper sheet 65 to the paper sheet 64 at the raised symbols outlines 70 on the upper faces 71 of the symbols elements 62.

Of course if more copies are required of the completed drawing then additional suitably interleaved sheets of paper and carbon paper may be employed, though the number of acceptable copies obtainable will depend on the sharpness of the symbols outlines 70, pressure exertable through the roller 69 etc. In general more and clearer copies can be obtained by using self-duplicating paper sets.

In order to facilitate drawing of the framework on the further sheet 68 there is advantageously used a top sheet 72 (indicated in dashed outline) of squared paper or the like which enables rectangular frames to be drawn out and measured thereon very easily, the framework being simultaneously transferred (by pressing suitably heavily with the drawing implement) onto the paper 64 and onto the further sheet 68 (with the aid of another carbon sheet 73 (indicated in chain-line).

As noted above the apparatus of the invention can be used for various purposes. Thus for example by using symbols elements in the form of alphanumeric characters or words or the like, an apparatus of the invention could be used for at least some forms of 'sign-writing'.

What is claimed is:

1. A draughting apparatus comprising a plurality of substantially planar right way round symbols elements having raised outlines for depicting predetermined symbols in their true non-reversed form, a support panel means for supporting the symbols elements in a general planar layout, said symbols elements being provided with symbol element locating means, and symbol transfer means comprising a self-duplicating set of sheets of draughting material having at least two sheets and a pressure transfer means, said at least two sheets being disposable between said raised outlines of said symbols elements and said pressure transfer means so that pressure applied by said pressure transfer means causes the outline of said symbols to be transferred to at least one of said two sheets to create an image of said symbols outlines thereon, wherein said symbols support means comprises a sheet of magnetic or magnetizable material and at least part of said symbols elements are, of a magnetizable or magnetic, respectively, material so that they are attracted to the sheet, said at least part of said symbols elements and said sheet together comprising said symbol element locating means, wherein said self-duplicating set of sheets comprises at least one further sheet, which further sheet is disposable between said symbol support means and said symbols elements with said symbols elements held in position on said further sheet means by said symbol element locating means, which further sheet is usable to display symbol element position indicator means.

2. Apparatus according to claim 1 wherein said symbols locating means comprises adhesive sheet material attached to the back of the symbols elements so that they can be attached to and detached from said first sheet of said set.

3. Apparatus according to claim 1 wherein said symbols support means comprises a first component and the underside of each symbols element a second component, of a hook and loop type fastener system constituting said symbols locating means.

4. Apparatus according to claim 1 wherein said self-duplication set of sheets of draughting material comprises a set of sheets of self-duplicating paper.

5. According to claim 1 wherein said self-duplicating set of sheets of draughting material comprises a sheet of paper and a sheet of printing ink transfer material.

6. Apparatus according to claim 4 wherein said pressure transfer means comprises a roller.

7. Apparatus according to claim 6 wherein said panel means comprises a drawing board having a sliding cursor, one side of the sliding cursor having a straight edge and the other side of the cursor mounting a said roller, the cursor being reversible through 180° so that the roller and the straight edge can be alternately positioned to face the drawing board surface.

8. Apparatus according to claim 1 wherein said raised outlines comprise scaled down representations of at least one of furniture items and appliance items.

9. Apparatus according to claim 8 wherein said furniture items and appliance items comprise furniture items and appliance items for at least one of: a kitchen, a bathroom, a storage area, a supermarket, a laundry room, a hospital ward, an office, a production bakery, a factory, a boat, a caravan, and a classroom.

10. Apparatus according to claim 9 wherein said furniture items and application items comprise kitchen furniture and kitchen appliance items.

11. A method of interior design of a building or room area, using a draughting apparatus including a plurality of substantially planar right way round symbols elements having raised outlines for depicting predetermined symbols in their true non-reversed form, a support panel means for supporting the symbols elements in a generally planar layout, said symbols elements being provided with symbol element locating means, and symbol transfer means comprising a self-duplicating set of sheets of draughting material having at least two sheets and a pressure transfer means, said at least two sheets being disposable between said raised outlines of said symbols elements and said pressure transfer means so that pressure applied by said pressure transfer means causes the outline of said symbols to be transferred to at least one of said two sheets to create an image of said symbols outlines thereon, wherein said symbols support means comprises a sheet of magnetic or magnetizable material and at least part of said symbols elements are, of a magnetizable or magnetic, respectively, material so that they are attracted to the sheet, said at least part of said symbols elements and said sheet together comprising said symbol element locating means, wherein said self-duplicating set of sheets comprises at least one further sheet, which further sheet is disposable between said symbol support means and said symbols elements with said symbols elements held in position on said further sheet means by said symbol element locating means, which further sheet is usable to display symbol element position indicator means, which method comprises the steps of drawing a scaled down outline of said area onto said self-duplicating set of sheets so as to transfer said outline through to at least one of said set of self-duplicating sheets and to said further sheet, disassembling said self-duplicating set of sheets so as to uncover said further sheet, positioning the symbols elements on said outline on said further sheet and reassembling said self-duplicating set of sheets which said symbols elements sandwiched therebetween, and applying pressure to said self-duplicating set of sheets of draughting material sufficient to transfer images of said symbols to said at least one of said sheets of draughting material in superimposed relation on said outline therein.

12. A method according to claim 11 wherein is provided a said apparatus in which said raised outlines represent scaled down representations of at least one of furniture items and appliance items.

* * * * *